(12) United States Patent
Ohara

(10) Patent No.: US 9,815,250 B2
(45) Date of Patent: Nov. 14, 2017

(54) TIRE MOLD

(71) Applicant: TOYO TIRE & RUBBER CO., LTD., Osaka-shi, Osaka (JP)

(72) Inventor: Masaaki Ohara, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 15/294,279

(22) Filed: Oct. 14, 2016

(65) Prior Publication Data
US 2017/0173904 A1 Jun. 22, 2017

(30) Foreign Application Priority Data
Dec. 16, 2015 (JP) .................. 2015-245054

(51) Int. Cl.
B29D 30/06 (2006.01)
(52) U.S. Cl.
CPC .. *B29D 30/0606* (2013.01); *B29D 2030/0612* (2013.01); *B29D 2030/0617* (2013.01)
(58) Field of Classification Search
CPC ........ B29D 30/0606; B29D 2030/0617; B29C 33/10
See application file for complete search history.

(56) References Cited

U.S. PATENT DOCUMENTS

| 1,416,362 A * | 5/1922 | Lambert ............ B29D 30/0629 425/46 |
| 4,655,699 A * | 4/1987 | Collier ................ B29C 33/0055 425/28.1 |
| 8,192,670 B2 * | 6/2012 | Yasunaga ........... B29D 30/0629 264/326 |
| 2009/0120561 A1 | 5/2009 | Yasunaga |
| 2015/0097314 A1 | 4/2015 | Sasaki |

FOREIGN PATENT DOCUMENTS

| JP | 2009-119624 A | 6/2009 |
| JP | 2014-87958 A | 5/2014 |
| JP | 2015-71274 A | 4/2015 |

* cited by examiner

*Primary Examiner* — James Mackey
(74) *Attorney, Agent, or Firm* — Westerman, Hattori, Daniels & Adrian, LLP (57) ABSTRACT

In a tire mold, a side molds and a tread molds include contact portions which come into contact with each other when the molds are closed,
the side molds include vent holes extending from an inner surfaces to the contact portions in a normal direction with respect to the inner surfaces, and
one of the side molds and the tread molds include communication holes through which the vent holes and outside of the tire mold are brought into communication with each other when the molds are closed.

13 Claims, 11 Drawing Sheets

TIRE MOLD

CROSS REFERENCE TO RELATED APPLICATIONS

This application claims the benefit of priority of Japanese application no. 2015-245054, filed on Dec. 16, 2015, which is incorporated herein by reference.

BACKGROUND OF THE INVENTION

Field of the Invention

The present invention relates to a tire mold for forming a closed space therein to form a tire when molds are closed.

Description of the Related Art

Conventionally, as a tire mold, there is known one including a pair of side molds having inner surfaces which come into contact with a sidewall portion of a tire, and a plurality of tread molds having inner surfaces which come into contact with a tread portion of the tire (e.g., JP-A-2014-87958, JP-A-2015-71274, JP-A-2009-119624). Each of the molds has a plurality of vent holes for discharging air in the tire mold to outside of the tire mold.

In each of the molds, the vent hole straightly extends from the inner surface to a position which corresponds to the outside of the tire mold. Depending upon a direction in which the vent hole extends with respect to the inner surface of the mold, it is difficult, in some cases, to discharge air in the tire mold to outside of the tire mold.

SUMMARY OF THE INVENTION

Hence, it is an object of the present invention to provide a tire mold capable of discharging air in a tire mold in a normal direction of an inner surface of a mold.

There is provided a tire mold provided therein with a closed space for forming a tire when molds are closed, the tire mold includes:

a pair of side molds separated from each other in a tire-width direction and having inner surfaces which come into contact with a sidewall portion of the tire; and a plurality of tread molds which are annularly arranged along a tire-circumferential direction lateral to the pair of side molds, and which have inner surfaces coming into contact with a tread portion of the tire, wherein the side molds and the tread molds include contact portions which come into contact with each other when the molds are closed, the side molds include vent holes extending from the inner surfaces to the contact portions in a normal direction with respect to the inner surfaces, and one of the side molds and the tread molds include communication holes through which the vent holes and outside of the tire mold are brought into communication with each other when the molds are closed.

Also, the tire mold may have a configuration in which:
the communication hole is provided in the tread mold,
the vent hole includes a contact portion opening formed in the contact portion of the side mold,
the communication hole includes a communication opening formed in the contact portion of the tread mold for bringing the communication hole and the contact portion opening into communication with each other when the molds are closed, and
the communication opening is formed larger than the contact portion opening.

Also, the tire mold may have a configuration in which:
the contact portion of the side mold is formed harder than the contact portion of the tread mold and is formed into a flat shape.

Also, the tire mold may have a configuration in which:
the communication hole includes a communication recess formed in the contact portion of the tread mold, and the communication recess is formed into a recess-shape extending from the communication opening toward the outside of the tire mold.

Also, the tire mold may have a configuration in which:
the communication opening is placed over an entire length of the contact portion of the tread mold in the tire-circumferential direction.

Also, the tire mold may have a configuration in which:
the communication recess is placed in an end of the contact portion of the tread mold in the tire-circumferential direction.

Also, the tire mold may have a configuration in which:
the communication recess is placed in an intermediate portion of the contact portion of the tread mold in the tire-circumferential direction.

Also, the tire mold may have a configuration in which:
the communication opening is formed into a recess-shape over an entire outer side of the contact portion of the tread mold in the tire-width direction for bringing the communication opening into communication with the outside of the tire mold.

Also, the tire mold may have a configuration in which:
the communication opening straightly extends parallel to the tire-width direction of the contact portion of the tread mold for bringing the communication opening into communication with the outside of the tire mold.

Also, the tire mold may have a configuration in which:
an opening end of the contact portion opening is chamfered such that a diameter of the opening end increases.

Also, the tire mold may have a configuration in which:
a thermal expansion rate of the side mold is smaller than that of the tread mold.

Also, the tire mold may have a configuration in which:
the communication hole is formed into one straight line together with the vent holes when the molds are closed.

Also, there is provided a tire mold provided therein with a closed space for forming a tire when molds are closed, the tire mold includes:

a pair of side molds separated from each other in a tire-width direction and having inner surfaces which come into contact with a sidewall portion of the tire; and a plurality of tread molds which are annularly arranged along a tire-circumferential direction lateral to the pair of side molds, and which have inner surfaces coming into contact with a tread portion of the tire, wherein the side molds and the tread molds include contact portions which come into contact with each other when the molds are closed, the tread molds include vent holes extending from the inner surfaces to the contact portions in a normal direction with respect to the inner surfaces, and one of the side molds and the tread molds include communication holes through which the vent holes and outside of the tire mold are brought into communication with each other when the molds are closed.

As described above, the tire mold exerts an excellent effect that air in the tire mold can be discharged in the normal direction of the inner surface of the mold.

DETAILED DESCRIPTION OF THE INVENTION

One of embodiments of a tire mold will be described below with reference to FIGS. 1 to 8. In the drawings (FIGS. 9 to 18 are also the same), sizes of the drawings do not absolutely match with actual sizes, and size ratios between the drawings do not absolutely match with each other.

Figure 1:
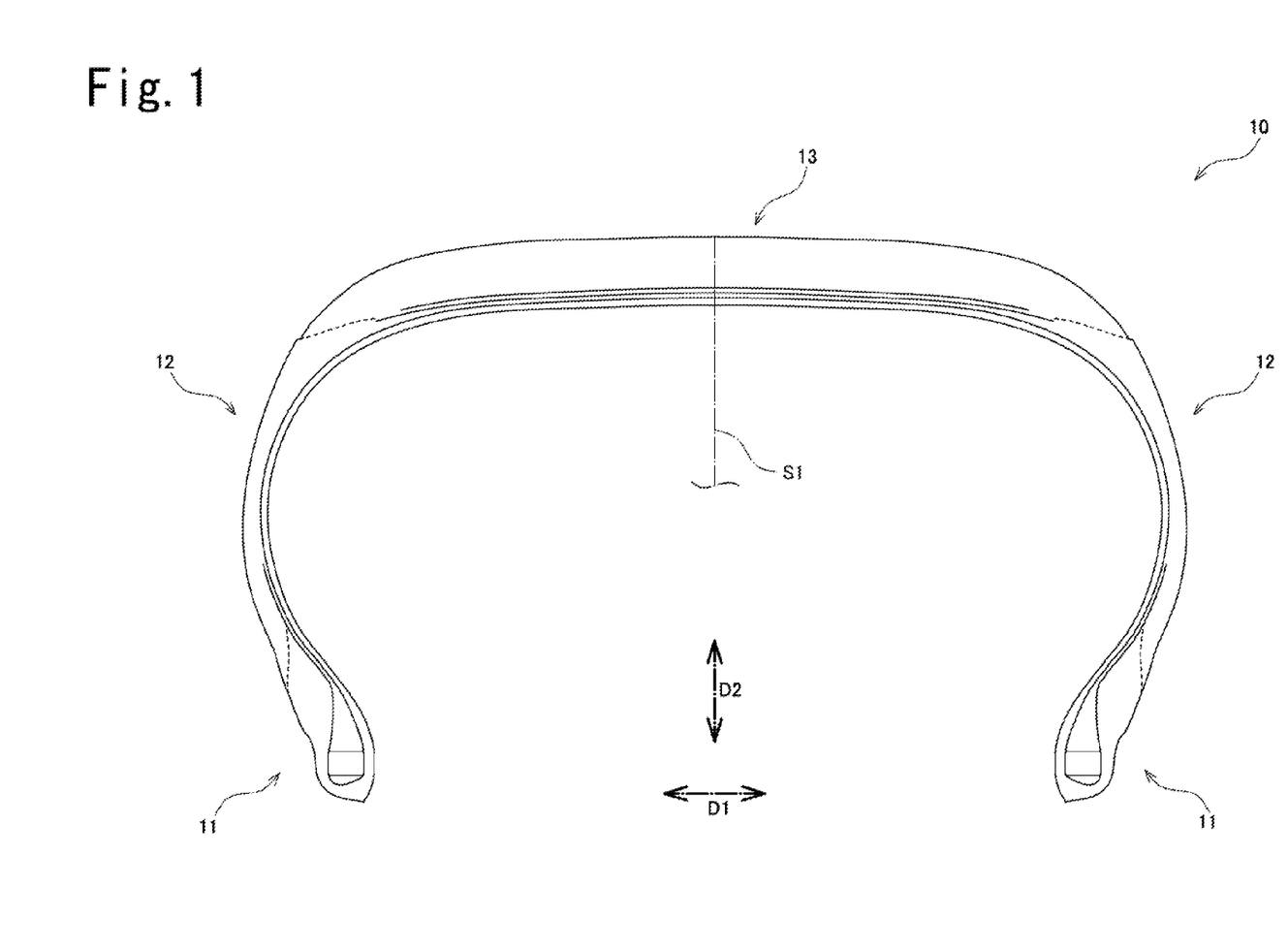
FIG. 1 is a sectional view of essential portions in a tire meridian plane of a pneumatic tire.
Figure 2:
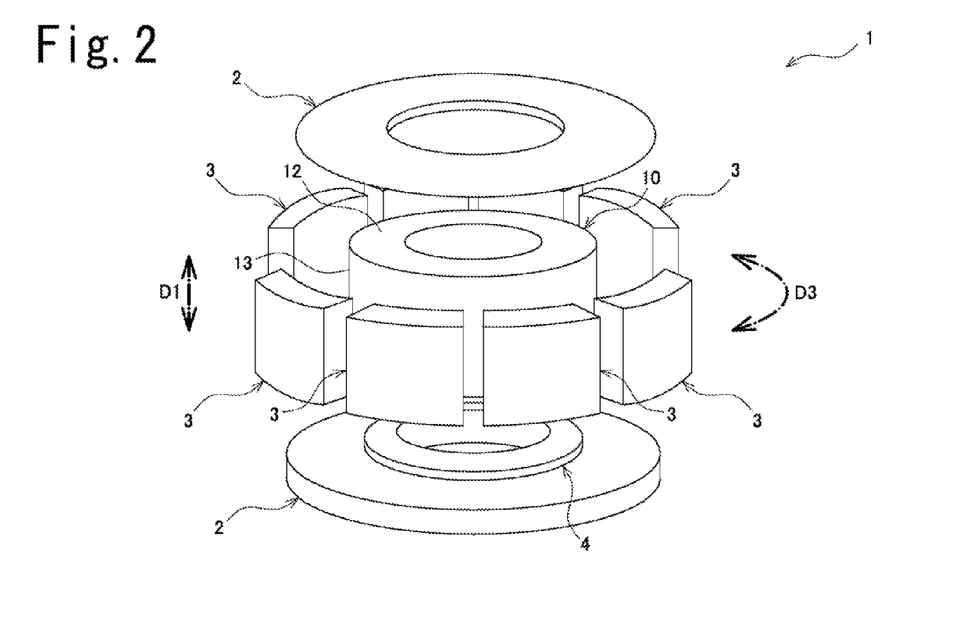
FIG. 2 is a schematic diagram showing a state where molds of a tire mold according to an embodiment are opened, and is a perspective view of the entire tire mold.
Figure 3:
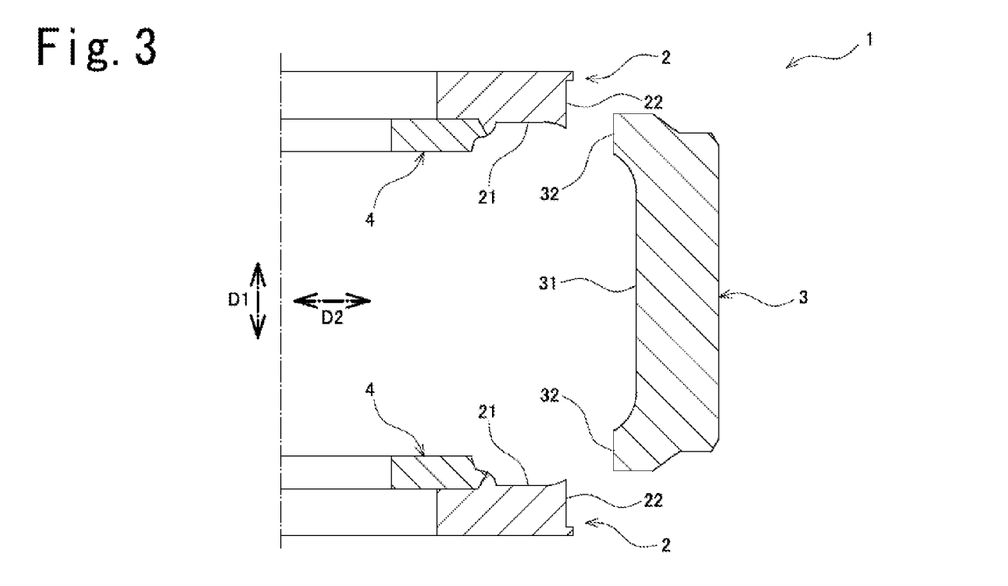
FIG. 3 is a schematic diagram showing the state where the molds of the tire mold according to the embodiment are opened, and is a sectional view of essential portions in the tire meridian plane.
Figure 4:
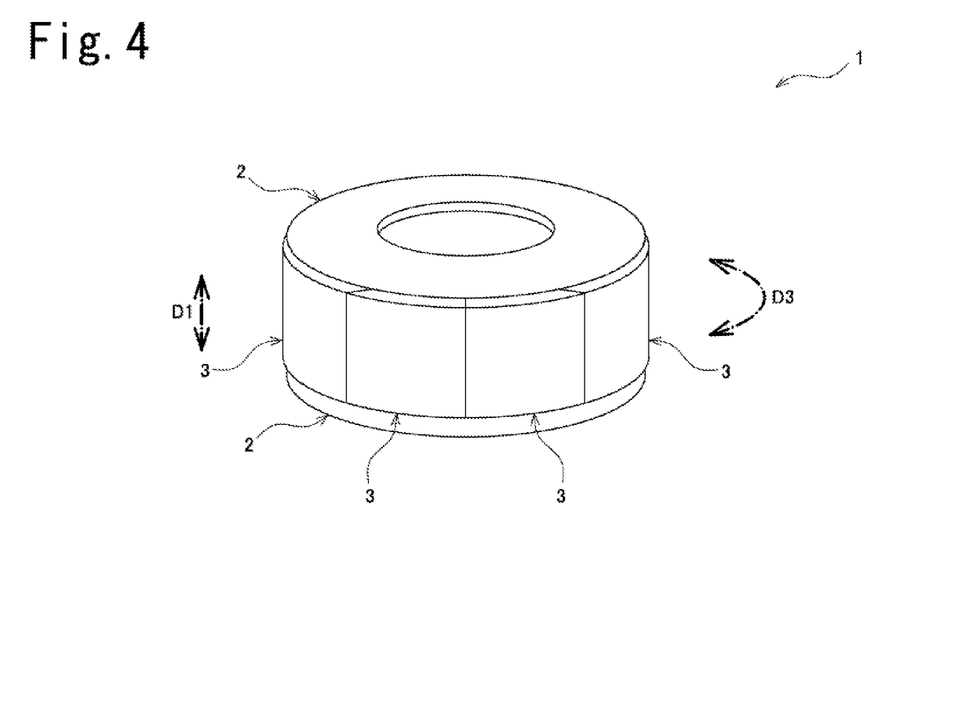
FIG. 4 is a schematic diagram showing a state where the molds of the tire mold according to the embodiment are closed, and is a perspective view of the entire tire mold.
Figure 5:
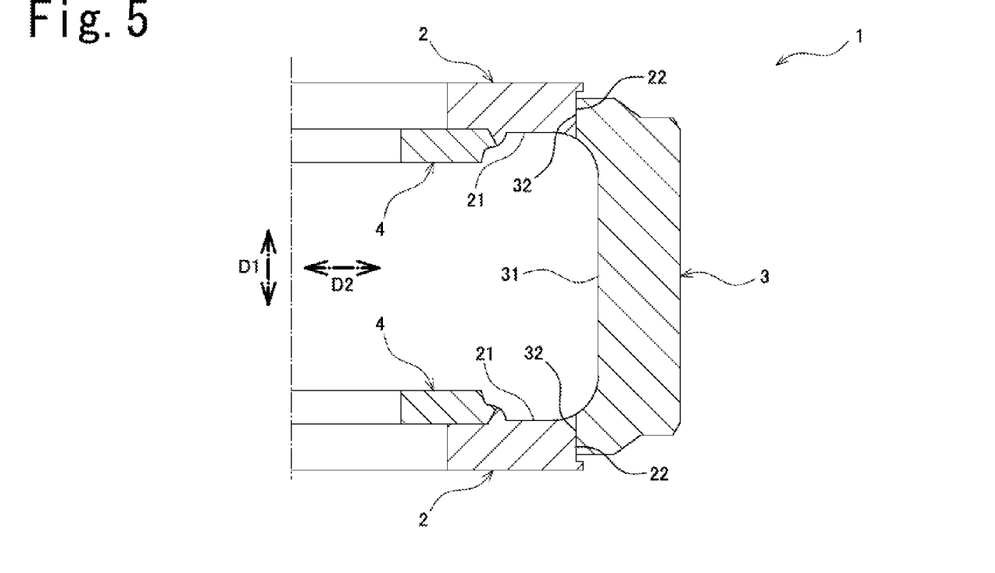
FIG. 5 is a schematic diagram showing the state where the molds of the tire mold according to the embodiment are closed, and is a sectional view of essential portions in the tire meridian plane.

First, before configurations of the tire mold are described, a pneumatic tire (simply referred to as "tire", hereinafter) produced by the tire mold will be described. As shown in FIG. 1, the tire 10 includes a pair of bead portions 11 each having a bead, sidewall portions 12 extending from the bead portions 11 outward in a tire-radial direction D2, and a tread portion 13 connected to outer ends of the pair of sidewall portions 12 in the tire-radial direction D2. The tread portion 13 has a tread surface.

In FIG. 1 (subsequent drawings are also the same), a tire-width direction D1 is a lateral direction. The tire-radial direction D2 is a radial direction of the tire 10, and a tire-circumferential direction D3 (not shown in FIG. 1) is a direction around a tire-rotation axis. In FIG. 1, a tire-radial direction D2 is parallel to the paper sheet, and is a vertical direction. A tire equatorial plane S1 is a plane which intersects with the tire-rotation axis at right angles and which is located at a center in the tire-width direction D1. A tire meridian plane is a plane including the tire-rotation axis, and intersecting with the tire equatorial plane S1 at right angles.

As shown in FIGS. 2 to 5, the tire mold 1 according to this embodiment includes a pair of side molds 2, 2 having inner surfaces 21 which come into contact with the sidewall portions 12 of the tire 10, and a plurality of tread molds 3 having inner surfaces 31 which come into contact with the tread portion 13 of the tire 10. The tire mold 1 includes a pair of bead molds 4, 4 into which the bead portions 11 of the tire 10 are fitted. In this embodiment, the tire mold 1 configures a portion of a tire-vulcanizing device which vulcanizes an unvulcanized tire to form a vulcanized tire.

The pair of side molds 2, 2 are separated from each other in the tire-width direction D1 with respect to the tire 10 which is set in the tire mold 1. The plurality of tread molds 3 are placed lateral to the pair of side molds 2, 2, and are annularly arranged along the tire-circumferential direction D3 with respect to the tire 10 which is set in the tire mold 1.

One of the side molds 2 can approach and separate from the other side mold 2 in the tire-width direction D1. The plurality of tread molds 3 approach and separate from the side molds 2 in the tire-radial direction D2. According to this, the tire mold 1 is switched between a molds-opened state shown in FIGS. 2 and 3 and a molds-closed state shown in FIGS. 4 and 5.

In the molds-opened state, since the side molds 2 and the tread molds 3 are separated from each other, the tire 10 can be brought into and out from the tire mold 1. In the molds-closed state, since the side molds 2 and the tread molds 3 are in contact with each other under pressure, a closed space (cabinet) for forming the tire 10 is formed in the tire mold 1.

The side molds 2 and the tread molds 3 include contact portions 22 and 32 which come into contact with each other in the molds-closed state. The contact portions (also referred to as "side contact portions", hereinafter) 22 of the side molds 2 are formed into convex curved surfaces which are parallel to the tire-width direction D1 and the tire-circumferential direction D3. The contact portions (also referred to as "tread contact portions", hereinafter) 32 of the tread molds 3 are formed into concave curved surfaces which are parallel to the tire-width direction D1 and the tire-circumferential direction D3.

Figure 6:
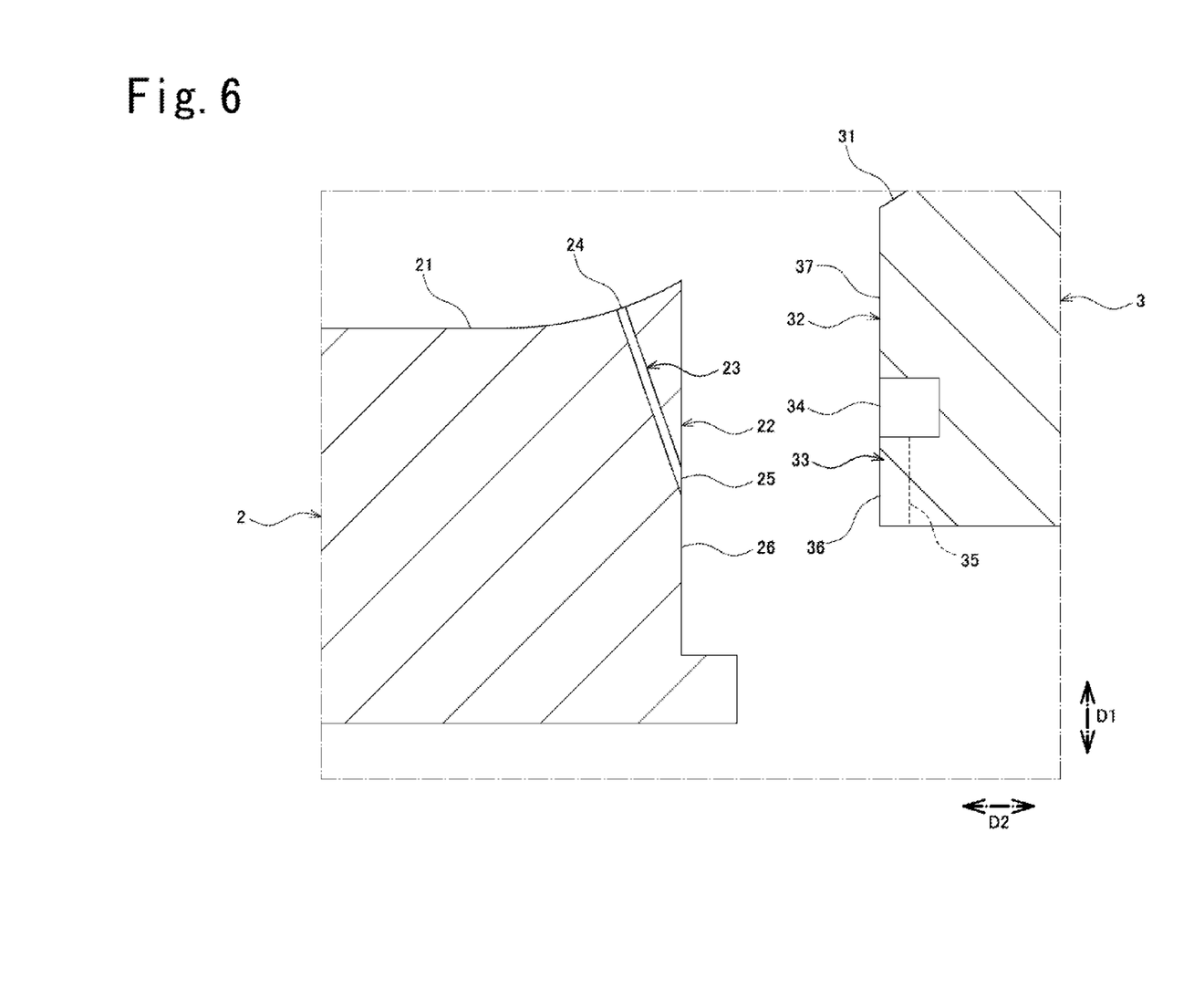
FIG. 6 is an enlarged sectional view of essential portions showing the state where the molds of the tire mold according to the embodiment are opened.
Figure 7:
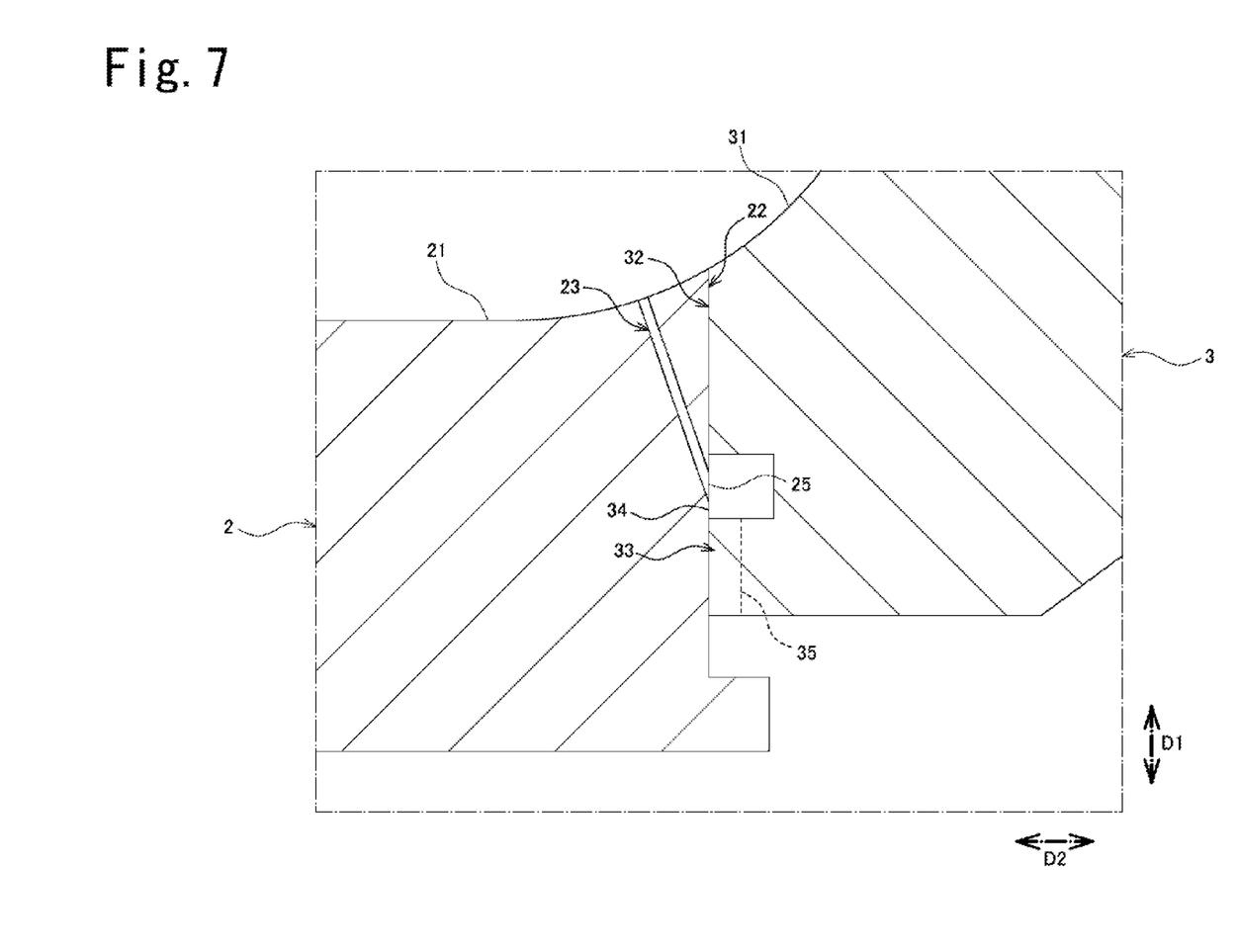
FIG. 7 is an enlarged sectional view of essential portions showing the state where the molds of the tire mold according to the embodiment are closed.

As shown in FIGS. 6 and 7, each of the side molds 2 includes a vent hole 23 which straightly extends in a normal direction from an inner surface 21 to the contact portion 22. This normal direction includes not only a complete normal direction but also substantially normal directions (e.g., a direction having an intersection angle of 5° or less with respect to complete normal direction). According to this, air in the tire mold 1 is discharged in the normal direction of the inner surfaces 21 of the side molds 2. Although only one vent hole 23 is illustrated in FIGS. 6 and 7, a plurality of vent holes 23 may be provided.

At least one of the plurality of vent holes 23 may extend from the inner surface 21 to the contact portion 22 with respect to the inner surface 21. It is preferable that more than half of the plurality of vent holes 23 extend from the inner surface 21 to the contact portion 22 in the normal direction with respect to the inner surface 21. It is further preferable that all of the plurality of vent holes 23 extend from the inner surface 21 to the contact portion 22 in the normal direction with respect to the inner surface 21.

Each of the vent holes 23 includes an inner surface opening 24 in the inner surface 21 of the side mold 2, and includes a contact portion opening 25 in the side contact portion 22. The inner surface opening 24 is circular in shape (circular when vent hole 23 extends in complete normal direction, and is slightly elliptic when vent hole 23 extends in substantially normal direction). The contact portion opening 25 is elliptic in shape. In the embodiment, an inner diameter is in a range of 1 mm to 3 mm. The inner diameter of the vent hole 23 may be uniform over its entire length, or may be partially varied.

Figure 8:
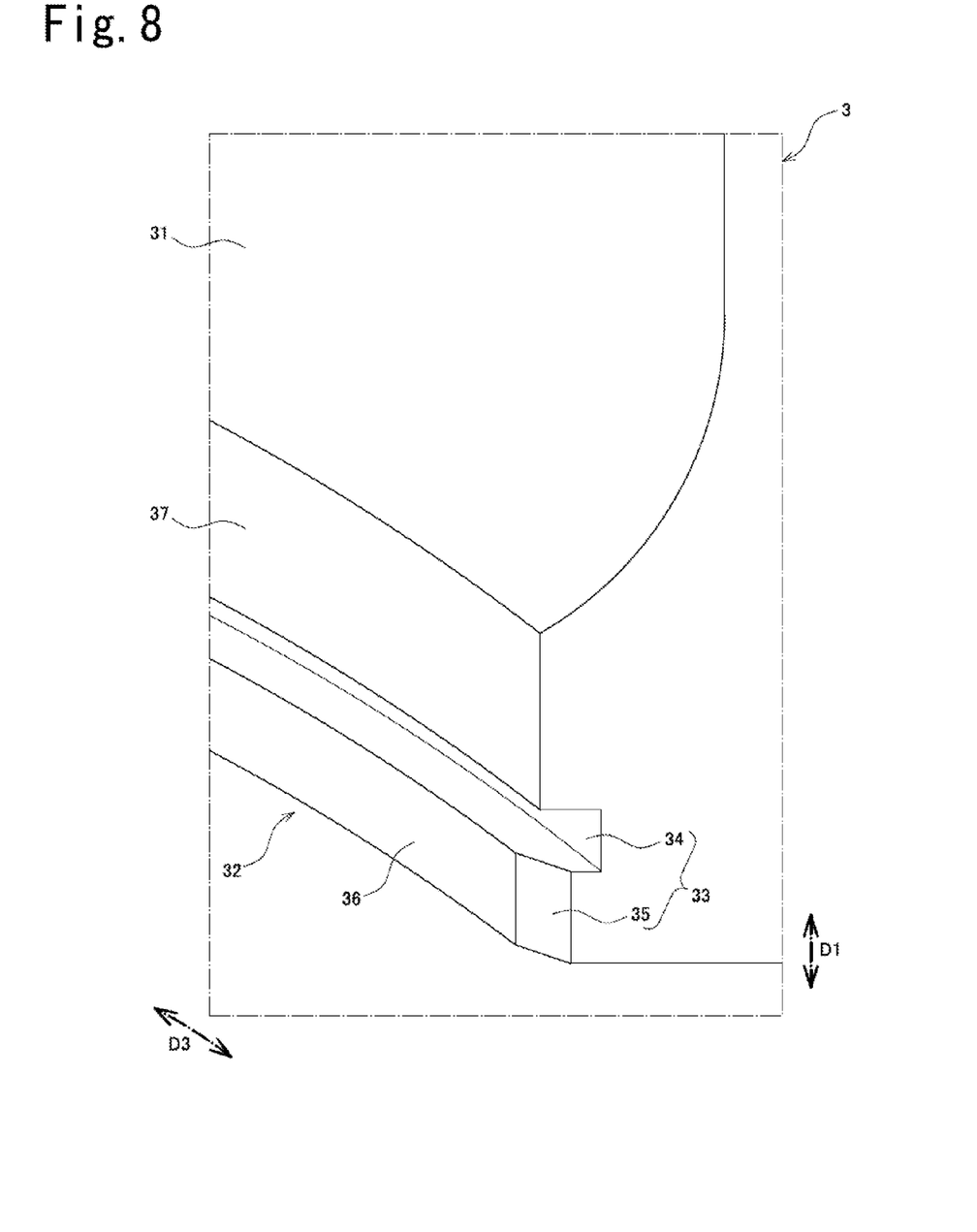
FIG. 8 is a perspective view of essential portions of tread molds according to the embodiment.

As shown in FIGS. 6 to 8, each of the tread molds 3 includes a communication hole 33 through which the vent hole 23 and outside of the tire mold 1 are brought into communication with each other in the molds-closed state. According to this, air in the tire mold 1 is discharged to outside of the tire mold 1 through the vent hole 23 and the communication hole 33 in the molds-closed state.

The communication hole 33 includes a communication opening 34 which is brought into communication with the contact portion opening 25 in the molds-closed state. The communication opening 34 is formed in the tread contact portion 32. To bring the communication opening 34 and the outside of the tire mold 1 into communication with each other in the molds-closed state, the communication hole 33 includes a communication recess 35 formed in the contact portion 32 of the tread mold 3. The communication recess 35 is formed into a recess shape from the communication opening 34 toward the outside of the tire mold 1.

The communication opening 34 is formed larger than the contact portion opening 25. According to this, a size of the communication opening 34 in the tire-circumferential direction D3 is larger than that of the contact portion opening 25 in the tire-circumferential direction D3. In this embodiment, the communication opening 34 extends along the tire-circumferential direction D3. More specifically, the communication opening 34 extends along the tire-circumferential direction D3 from one end of the tread contact portion 32 in the tire-circumferential direction D3 to the other end (over entire length of tread contact portion 32 in tire-circumferential direction D3).

According to this, when the molds-closed state is repeated, even if a position where the side contact portion 22 and the tread contact portion 32 come into contact with each other is slightly varied in the tire-circumferential direction D3, the contact portion opening 25 and the communication opening 34 can be brought into communication with each other. Since the communication opening 34 extends along the tire-circumferential direction D3, the communication opening 34 may be brought into communication with the plurality of contact portion openings 25 in the molds-closed state.

A size of the communication opening 34 in the tire-width direction D1 is larger than that of the contact portion opening 25 in the tire-width direction D1. In the embodiment, a size of the communication opening 34 in the tire-width direction D1 is in a range of 3 mm to 5 mm. According to this, when the molds-closed state is repeated, even if a position where the side contact portion 22 and the tread contact portion 32 come into contact with each other is slightly varied in the tire-width direction D1, the contact portion opening 25 and the communication opening 34 can be brought into communication with each other.

The contact portion opening 25 is configured such that at least a portion thereof is brought into communication with the communication opening 34 in the molds-closed state. More specifically, it is preferable that a 50% or more area of the contact portion opening 25 is brought into communication with the communication opening 34 in the molds-closed state. It is further preferable that the entire area (100% area) of the contact portion opening 25 is brought into communication with the communication opening 34.

To reliably bring the contact portion opening 25 and the communication opening 34 into communication with each other, ends of the openings are chamfered such that their diameters increase. Such chamfering may be carried out such that a 0.3 mm to 2.0 mm position from each of the opening edges is cut off at a 45° angle, for example (C0.3 to C2.0).

The communication recess 35 straightly extends from the communication opening 34 outward of the tire mold 1. In this embodiment, the communication recess 35 straightly extends along an edge of the tread contact portion 32. That is, the communication recess 35 extends from the end of the communication opening 34 in the tire-circumferential direction D3 outward of the tire-width direction D1 parallel to the tire-width direction D1. For example, the communication recess 35 is formed by cutting the edge of the tread contact portion 32.

Since the communication recess 35 is placed at an end of the tread contact portion 32 in the tire-circumferential direction D3, a contact surface 36 of an outer side of the tire mold 1 of the tread contact portion 32 (outer side of communication opening 34 in tire-width direction D1) is not divided. According to this, as compared with a configuration where the contact surface 36 is divided, since the contact surface 36 has rigidity, it is possible to restrain the tread contact portion 32 (especially contact surface 36) from deforming.

The side contact portion 22 is formed harder than the tread contact portion 32. More specifically, the side mold 2 is formed harder than the tread mold 3. A thermal expansion rate of the side mold 2 is smaller than that of the tread mold 3. For example, the side mold 2 is made of steel iron or stainless steel, and the tread mold 3 is made of aluminum.

The side contact portion 22 is formed into a flat shape (including surface having no pits and projections, flat surface, and curved surface). More specifically, the side contact portion 22 is composed of a convex flat surface 26 and a convex contact portion opening 25 which are curved parallel to the tire-width direction D1 and the tire-circumferential direction D3, and the side contact portion 22 does not have other pits or projections. Since the side contact portion 22 is formed harder than the tread contact portion 32, the tread contact portion 32 gradually deforms.

However, since the side contact portion 22 is formed into the flat shape, even when the tread contact portion 32 deforms, the flatness of the contact surfaces 36 and 37 of the tread contact portion 32 can be maintained. According to this, even if the tread contact portion 32 deforms and even if a position where the tread contact portion 32 and the side contact portion 22 come into contact with each other is slightly varied when the molds-closed state is repeated, adhesion between the tread contact portion 32 and the side contact portion 22 can be maintained.

Although it is not illustrated in the drawings, each of the molds 2 and 3 includes the plurality of vent holes extending from the inner surfaces 21 and 31 to a position corresponding to the outside of the tire mold 1 instead of the contact portions 22 and 32. The vent holes may not straightly extend in the normal direction with respect to the inner surfaces 21 and 31, and may straightly extend in the tire-width direction D1 or the tire-radial direction D2, for example.

It is preferable that at least one of the plurality of vent holes straightly extend in the normal direction with respect to the inner surfaces 21 and 31, and it is further preferable that more than half of the plurality of vent holes straightly extend in the normal direction with respect to the inner surfaces 21 and 31, and it is extremely preferable that all of the plurality of vent holes straightly extend in the normal direction with respect to the inner surfaces 21 and 31. Although it is not illustrated in the drawings, the tire mold 1 may include a rubber stop valve (vent piece) which is attached to the vent hole 23 or the inside of the vent hole.

As described above, a tire mold according to the embodiment provided therein with a closed space for forming a tire 10 when molds are closed, the tire mold including:

the pair of side molds 2, 2 which are separated from each other in the tire-width direction D1 and which have inner surfaces 21 coming into contact with the sidewall portions 12 of the tire 10; and the plurality of tread molds 3 which are annularly arranged along the tire-circumferential direction D3 lateral to the pair of side molds 2, and which have inner surfaces 31 coming into contact with the tread portion 13 of the tire 10, the side molds 2 and the tread molds 3 include the contact portions 22 and 32 which come into contact with each other when the molds are closed, the side molds 2 include vent holes 23 extending from the inner surfaces 21 to the contact portions 22 in a normal direction with respect to the inner surfaces 21, one of the side mold 2 and the tread mold 3 (tread mold 3 in this embodiment) includes a communication hole 33 through which the vent hole 23 and the outside of the tire mold 1 are brought into communication with each other when the molds are closed.

According to this configuration, when the molds are closed, the contact portions 22 of the side molds 2 and the contact portions 32 of the tread molds 3 come into contact with each other, and the closed space for forming the tire 10 is formed in the tire mold 1. Each of the side molds 2 includes the vent hole 23 which extends from the inner surface 21 to the contact portion 22 in the normal direction with respect to the inner surface 21. According to this, air in the tire mold 1 is discharged in the normal direction of the inner surface 21 of the side mold 2. Therefore, it is possible to efficiently discharge the air in the tire mold 1, for example.

One of the side mold 2 and the tread mold 3 (tread mold 3 in the embodiment) includes the communication hole 33 through which the vent hole 23 and the outside of the tire mold 1 are brought into communication with each other when the molds are closed. According to this, air in the tire mold 1 is discharged outside of the tire mold 1 through the vent hole 23 and then through the communication hole 33.

Further, since the vent hole 23 extends from the inner surface 21 to the contact portion 22 in the normal direction with respect to the inner surface 21, a length of the vent hole 23 can be shortened as compared with a vent hole which extends from the inner surface 21 in the tire-width direction D1, for example. According to this, it is possible to efficiently discharge air in the tire mold 1 to outside of the tire mold 1.

In the tire mold 1 according to the embodiment, the communication hole 33 is provided in the tread mold 3, the vent hole 23 includes the contact portion opening 25 in the contact portion 22 of the side mold 2, the communication hole 33 includes the communication opening 34 in the contact portion 32 of the tread mold 3 which comes into communication with the contact portion opening 25 when the molds are closed, and the communication opening 34 is formed larger than the contact portion opening 25.

According to this configuration, the vent hole 23 includes the contact portion opening 25 in the contact portion 22 of the side mold 2. The communication hole 33 is provided in the tread mold 3, and the communication opening 34 is provided in the contact portion 32 of the tread mold 3. Since the contact portion opening 25 and the communication hole 33 are brought into communication with each other when the molds are closed, air in the tire mold 1 is discharged outside of the tire mold 1 through the vent hole 23 and the communication hole 33.

The communication opening 34 is formed larger than the contact portion opening 25. According to this, when the molds-closed state is repeated, even if the position where the contact portion 32 of the tread mold 3 and the contact portion 22 of the side mold 2 come into contact with each other is slightly varied, it is possible to reliably bring the contact portion opening 25 and the communication opening 34 into communication with each other. Therefore, it is possible to reliably discharge air in the tire mold 1 to the outside of the tire mold 1, for example.

In the tire mold 1 according to the embodiment, the contact portion 22 of the side mold 2 is formed harder than the contact portion 32 of the tread mold 3, and is formed into the flat shape.

According to this configuration, since the contact portion 22 of the side mold 2 is formed harder than the contact portion 32 of the tread mold 3, it is possible to restrain the contact portion 22 of the side mold 2 from deforming. Further, since the contact portion 22 of the side mold 2 is formed into the flat shape, it is possible to restrain the contact portion 32 of the tread mold 3 from deforming in a concavo-convex manner, for example.

According to this, when the molds-closed state is repeated, even if the position where the contact portion 32 of the tread mold 3 and the contact portion 22 of the side mold 2 come into contact with each other is slightly varied, it is possible to maintain the adhesion between the contact portion 32 of the tread mold 3 and the contact portion 22 of the side mold 2. Therefore, even if the contact portion 32 of the tread mold 3 deforms, it is possible to reliably form the closed space for forming the tire 10.

In the tire mold 1 according to the embodiment, the communication hole 33 includes the communication recess 35 provided in the contact portion 32 of the tread mold 3 such that the communication recess 35 is formed into a recess shape extending from the communication opening 34 toward outside of the tire mold 1.

According to this configuration, the communication recess 35 is provided in the contact portion 32 of the tread mold 3 such that the communication recess 35 is formed into a recess shape extending from the communication opening 34 toward outside of the tire mold 1. According to this, a working operation for forming the communication hole 33 in the tread mold 3 can be made easy. The communication opening 34 and the outside of the tire mold 1 are brought into communication with each other through the communication recess 35.

The tire mold is not limited to the configurations of the above-described embodiment, and is not limited to the above-described working effects. Of course, the tire mold can variously be modified within a scope not departing from the subject matter of the present invention. For example, it is of course possible to select one or more of configurations and methods of various kinds of later-described modifications, and to employ such configurations and methods to the configurations and the method of the above-described embodiment.

Figure 9:
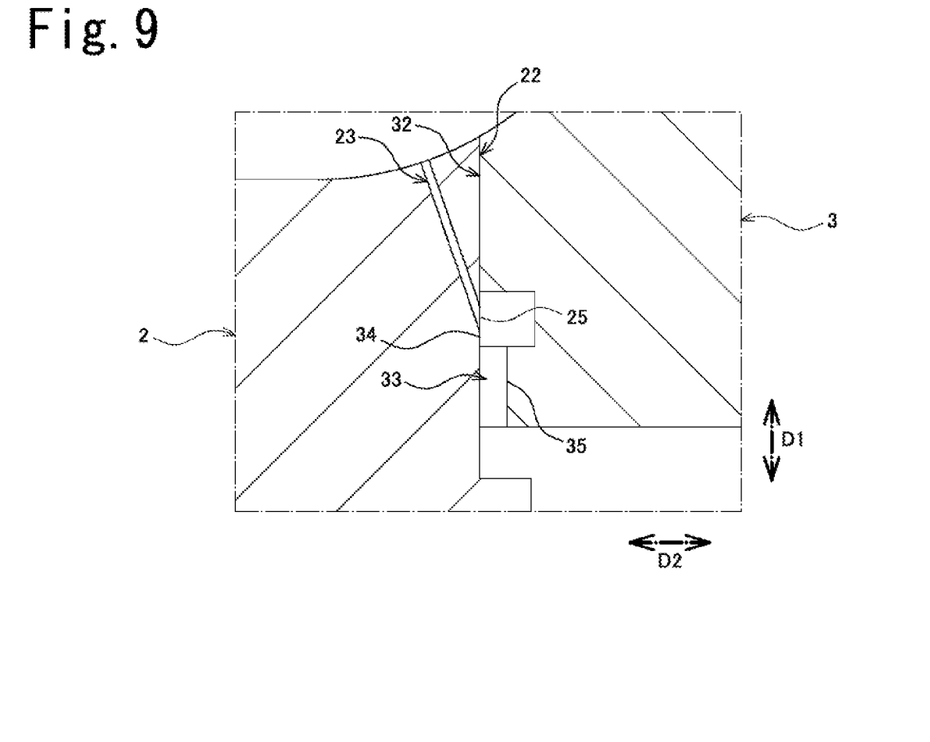
FIG. 9 is a sectional view of essential portions showing a state where molds of a tire mold according to another embodiment are closed.
Figure 10:
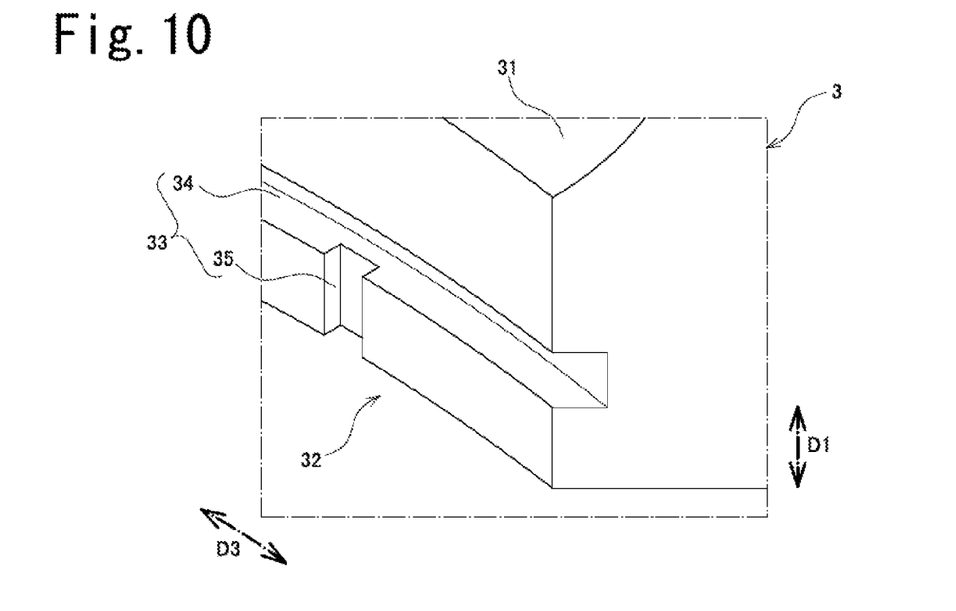
FIG. 10 is a perspective view of essential portions of tread molds according to the embodiment.

In the tire mold 1 of the embodiment, the communication recess 35 extends along the edge of the tread contact portion 32, i.e., the communication recess 35 is placed at the end of the tread contact portion 32 in the tire-circumferential direction D3. However, the tire mold is not limited to this configuration. For example, the communication recess 35 may be placed on an intermediate portion of the tread contact portion 32 in the tire-circumferential direction D3 as shown in FIGS. 9 and 10.

In the tire mold 1 according to the embodiment, the communication hole 33 includes the communication opening 34 and the communication recess 35. However, the tire mold is not limited to this configuration. For example, in the tire mold, the communication hole 33 may include only the communication opening 34 through which the contact portion opening 25 and the outside of the tire mold 1 are brought into communication with each other as shown in FIGS. 11 to 14. According to this configuration, a working operation for forming the communication hole 33 in the tread mold 3 can further be made easy.

Figure 11:
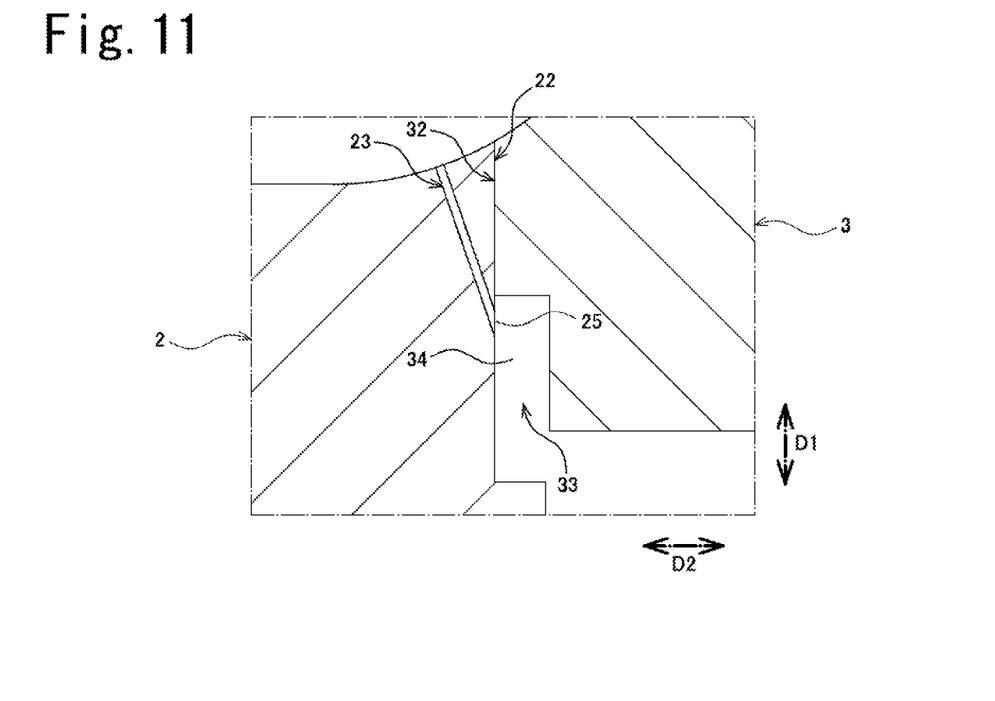
FIG. 11 is a sectional view of essential portions showing a state where molds of a tire mold according to another embodiment are closed.
Figure 12:
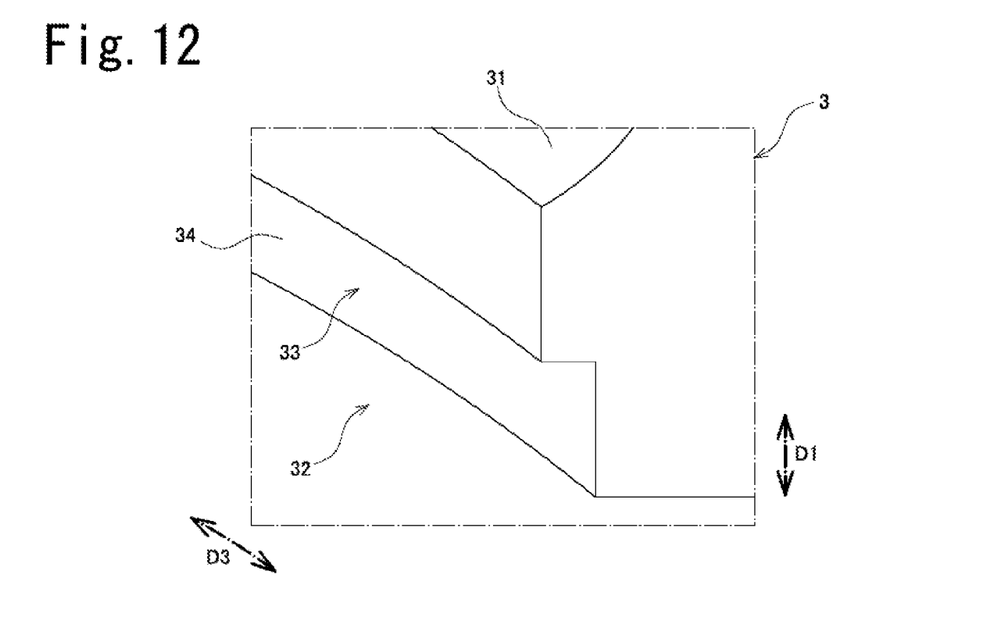
FIG. 12 is a perspective view of essential portions of tread molds according to the embodiment.

The communication opening 34 shown in FIGS. 11 and 12 is formed by recessing the entire outer side of the tire mold 1 of the tread contact portion 32. More specifically, the communication opening 34 is formed into the recess shape over the entire outer side in the tire-width direction D1 of the tread contact portion 32.

Figure 13:
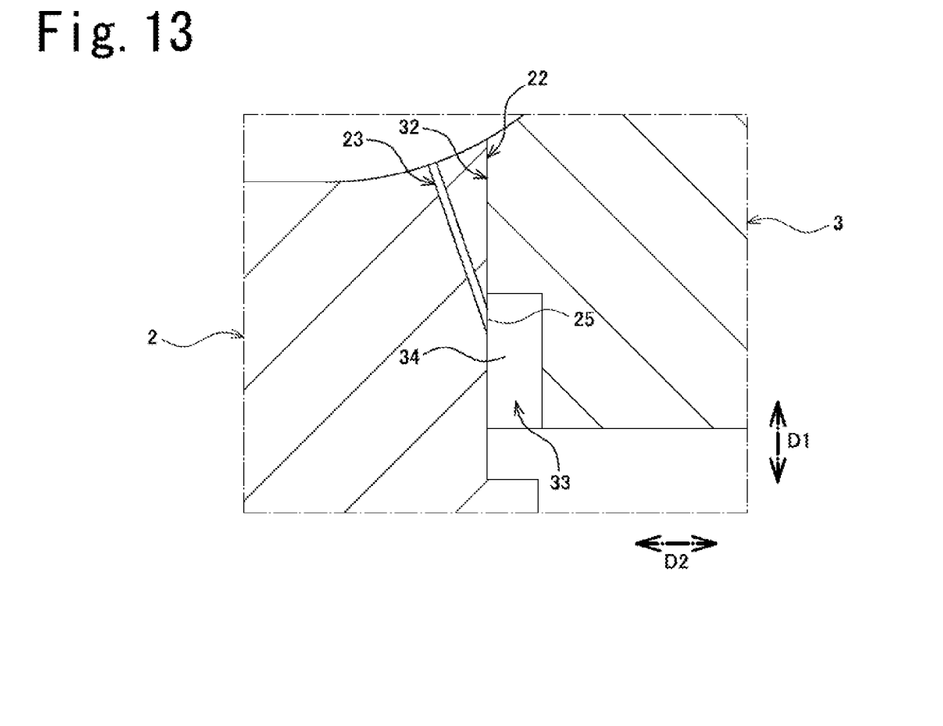
FIG. 13 is a sectional view of essential portions showing a state where molds of a tire mold according to another embodiment are closed.
Figure 14:
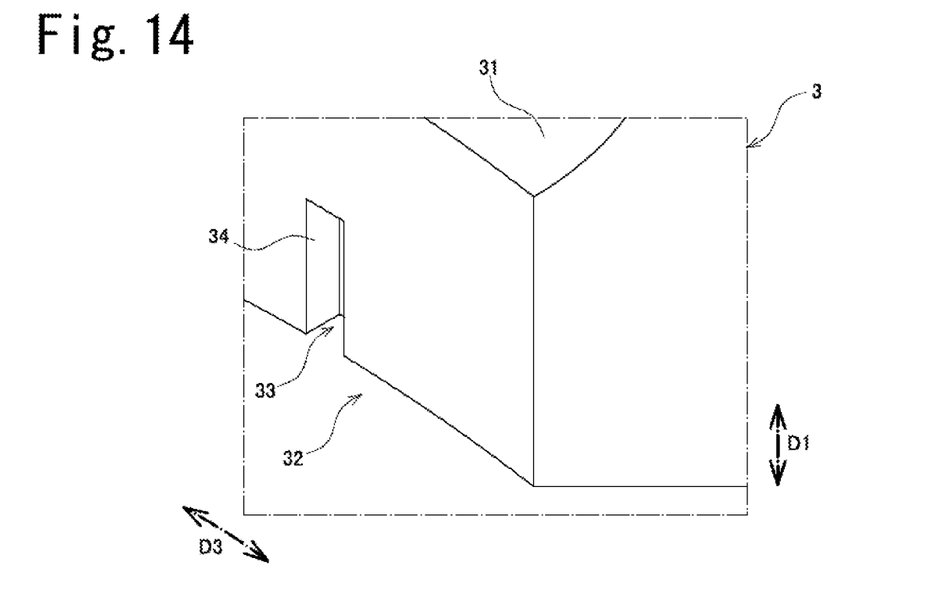
FIG. 14 is a perspective view of essential portions of tread molds according to the embodiment.

In the tire mold 1 according to the embodiment, the communication opening 34 is formed over the entire length of the tread contact portion 32 in the tire-circumferential direction D3. However, the tire mold is not limited to this configuration. For example, in the tire mold, the communication opening 34 may be placed in a portion of the tread contact portion 32 in the tire-circumferential direction D3 as shown in FIGS. 13 and 14. The communication opening 34 shown in FIGS. 13 and 14 straightly extends parallel to the tire-width direction D1.

Figure 15:
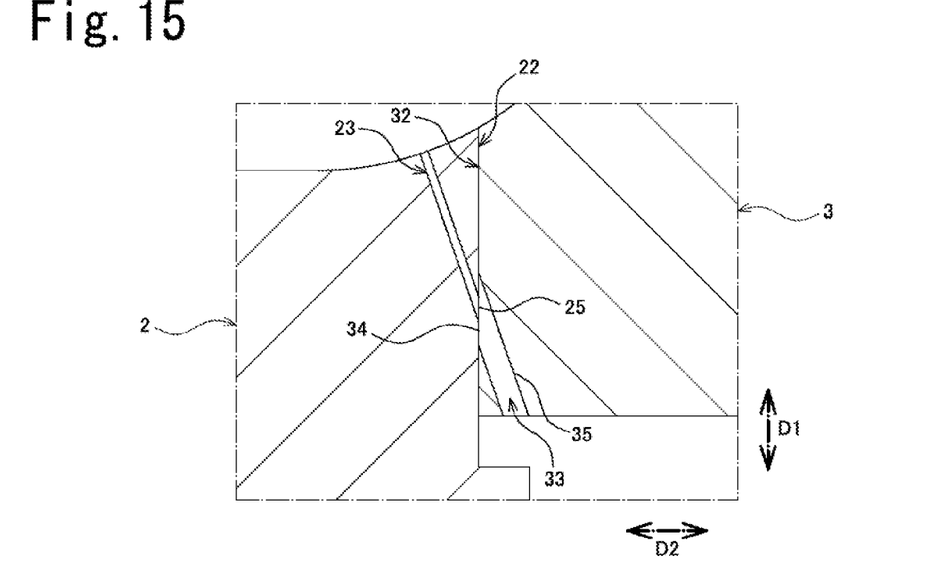
FIG. 15 is a sectional view of essential portions showing a state where molds of a tire mold according to another embodiment are closed.

In the tire mold 1 according to the embodiment, the communication recess 35 is formed in the tread contact portion 32 in the recess form. However, the tire mold is not limited to this configuration. For example, in the tire mold, the communication recess 35 may be formed in the tread mold 3 as shown in FIG. 15. The communication hole 33 shown in FIG. 15 is placed such that it forms one straight line together with the vent hole 23 when the molds are closed.

In the tire mold 1 according to the embodiment, the side contact portion 22 is formed harder than the tread contact portion 32. However, the tire mold is not limited to this configuration. For example, in the tire mold, the side contact portion 22 may be formed such that it has the same hardness as the tread contact portion 32, or the side contact portion 22 may be formed softer than the tread contact portion 32.

In the tire mold 1 according to the embodiment, the communication hole 33 is provided in the tread mold 3. However, the tire mold is not limited to this configuration. For example, in the tire mold, the communication hole 27 may be provided in the side mold 2 as shown in FIG. 16.

Figure 16:
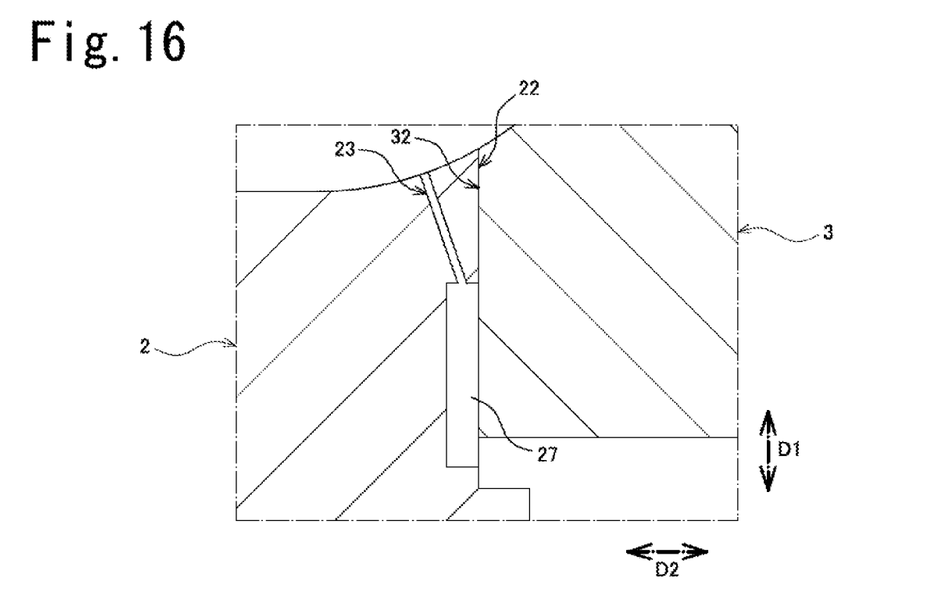
FIG. 16 is a sectional view of essential portions showing a state where molds of a tire mold according to another embodiment are closed.
Figure 17:
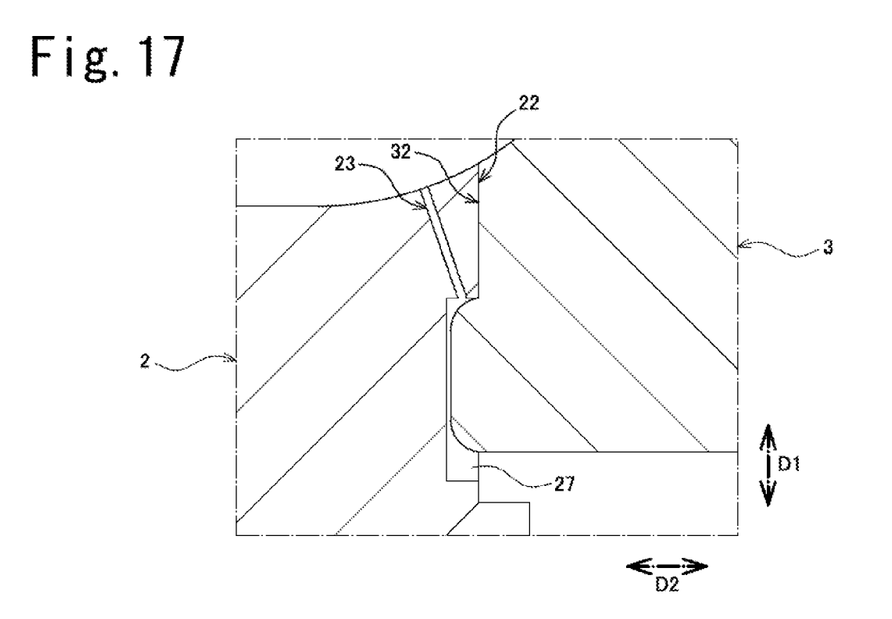
FIG. 17 is a sectional view of essential portions showing the state where the molds of the tire mold according to the embodiment are closed.
Figure 18:
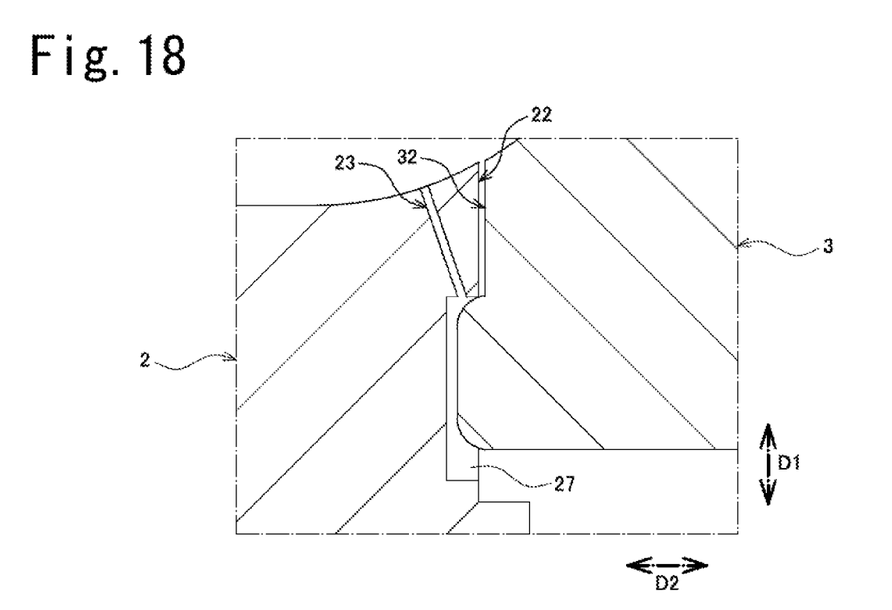
FIG. 18 is a sectional view of essential portions showing the state where the molds of the tire mold according to the embodiment are closed.

When the side contact portion 22 is formed harder than the tread contact portion 32 in the configuration shown in FIG. 16, if the molds-closed state is repeated, the tread contact portion 32 deforms, in some cases, in a convex manner toward the communication hole 27 of the side contact portion 22 as shown in FIG. 17. According to this, if the position where the side contact portion 22 and the tread contact portion 32 come into contact with each other is slightly varied, adhesion between the side contact portion 22 and the tread contact portion 32 is lowered as shown in FIG. 18.

Therefore, it is preferable that of the side contact portion 22 and the tread contact portion 32, the communication hole 33 is formed in the mold 3 having the softer contact portion 32 as in the tire mold 1 according to the embodiment. On this basis, it is preferable that of the side contact portion 22 and the tread contact portion 32, the harder contact portion 22 is formed into the flat shape as in the tire mold 1 according to the embodiment.

In the tire mold 1 according to the embodiment, the communication opening 34 is formed larger than the contact portion opening 25. However, the tire mold is not limited to this configuration. For example, in the tire mold, the communication opening 34 may be formed into the same size as the contact portion opening 25, or the communication opening 34 may be formed smaller than the contact portion opening 25.

In the tire mold 1 according to the embodiment, the vent hole 23 is formed in the side mold 2. However, the tire mold is not limited to this configuration. For example, in the tire mold, the vent hole may be formed in the tread mold 3.

More specifically, the tread mold 3 may have a vent hole which extends from the inner surface 31 to the contact portion 32 in the normal direction with respect to the inner surface 31. In this configuration, one of the side mold 2 and the tread mold 3 includes a communication hole through which the vent hole and the outside of the tire mold 1 are brought into communication with each other when the molds are closed.

In the tire mold 1 according to the embodiment, the contact portions 22 and 32 are formed into curved surfaces which are parallel to the tire-width direction D1 and the tire-circumferential direction D3. However, the tire mold is not limited to this configuration. For example, in the tire mold, the contact portions 22 and 32 may be formed into surfaces which incline from at least one of the tire-width direction D1 and the tire-circumferential direction D3.

What is claimed is:

1. A tire mold provided therein with a closed space for forming a tire when molds are closed, the tire mold comprising:
    a pair of side molds separated from each other in a tire-width direction and having inner surfaces which come into contact with a sidewall portion of the tire; and
    a plurality of tread molds which are annularly arranged along a tire-circumferential direction lateral to the pair of side molds, and which have inner surfaces coming into contact with a tread portion of the tire, wherein
    the side molds and the tread molds include contact portions which come into contact with each other when the molds are closed,
    the side molds include vent holes extending from the inner surfaces to the contact portions in a normal direction with respect to the inner surfaces, and
    one of the side molds and the tread molds include communication holes through which the vent holes and outside of the tire mold are brought into communication with each other when the molds are closed.

2. The tire mold according to claim 1, wherein
the communication hole is provided in the tread mold,
the vent hole includes a contact portion opening formed in the contact portion of the side mold,
the communication hole includes a communication opening formed in the contact portion of the tread mold for bringing the communication hole and the contact portion opening into communication with each other when the molds are closed, and
the communication opening is formed larger than the contact portion opening.

3. The tire mold according to claim 2, wherein
the contact portion of the side mold is formed harder than the contact portion of the tread mold and is formed into a flat shape.

4. The tire mold according to claim 2, wherein
the communication hole includes a communication recess formed in the contact portion of the tread mold, and the communication recess is formed into a recess-shape extending from the communication opening toward the outside of the tire mold.

5. The tire mold according to claim 4, wherein
the communication opening is placed over an entire length of the contact portion of the tread mold in the tire-circumferential direction.

6. The tire mold according to claim 5, wherein
the communication recess is placed in an end of the contact portion of the tread mold in the tire-circumferential direction.

7. The tire mold according to claim 5, wherein
the communication recess is placed in an intermediate portion of the contact portion of the tread mold in the tire-circumferential direction.

8. The tire mold according to claim 2, wherein
the communication opening is formed into a recess-shape over an entire outer side of the contact portion of the tread mold in the tire-width direction for bringing the communication opening into communication with the outside of the tire mold.

9. The tire mold according to claim 2, wherein
the communication opening straightly extends parallel to the tire-width direction of the contact portion of the tread mold for bringing the communication opening into communication with the outside of the tire mold.

10. The tire mold according to claim 2, wherein
an opening end of the contact portion opening is chamfered such that a diameter of the opening end increases.

11. The tire mold according to claim 1, wherein
a thermal expansion rate of the side mold is smaller than that of the tread mold.

12. The tire mold according to claim 2, wherein
the communication hole is formed into one straight line together with the vent holes when the molds are closed.

13. A tire mold provided therein with a closed space for forming a tire when molds are closed, the tire mold comprising:
a pair of side molds separated from each other in a tire-width direction and having inner surfaces which come into contact with a sidewall portion of the tire; and
a plurality of tread molds which are annularly arranged along a tire-circumferential direction lateral to the pair of side molds, and which have inner surfaces coming into contact with a tread portion of the tire, wherein
the side molds and the tread molds include contact portions which come into contact with each other when the molds are closed,
the tread molds include vent holes extending from the inner surfaces to the contact portions in a normal direction with respect to the inner surfaces, and
one of the side molds and the tread molds include communication holes through which the vent holes and outside of the tire mold are brought into communication with each other when the molds are closed.

* * * * *